United States Patent [19]

Cramm et al.

[11] Patent Number: 5,248,744
[45] Date of Patent: Sep. 28, 1993

[54] PROCESS OF POLYMERIZING DIALLYLDIALKYL AMMONIUM COMPOUNDS WITH AZO CATALYST

[75] Inventors: Jeffrey R. Cramm; Fran K. Kravitz, both of Winfield, Ill.

[73] Assignee: Nalco Chemical Company, Naperville, Ill.

[21] Appl. No.: 871,300

[22] Filed: Apr. 20, 1992

[51] Int. Cl.⁵ .............................. C08F 2/16
[52] U.S. Cl. ..................... 526/73; 526/219.3
[58] Field of Search ............ 526/73, 219.3, 219.5

[56] References Cited

U.S. PATENT DOCUMENTS

| | | | |
|---|---|---|---|
| 4,151,202 | 4/1979 | Hunter | 526/295 |
| 4,742,134 | 5/1988 | Butler et al. | |
| 4,753,999 | 6/1988 | Keil | 526/295 |
| 4,774,022 | 9/1988 | Sumi | 526/295 |

FOREIGN PATENT DOCUMENTS 56-18611  2/1981  Japan.

OTHER PUBLICATIONS

Jaeger et al., *J. Macromol. Sci-Chem.*, A21 (1984) pp. 593-614.

*Primary Examiner*—Christopher Henderson
*Attorney, Agent, or Firm*—Dressler Goldsmith Shore Sutker & Milnamow, Ltd.

[57] ABSTRACT

The present invention provides a process for polymerizing diallyldialkyl ammonium compounds to produce polymers with increased molecular weight in which the polymerization is carried out in an aqueous medium containing an inorganic salt and a water soluble free radical initiator that does not react with the inorganic salt or a counterion of the diallyldialkyl ammonium compound to form a chain transfer or chain terminating agent.

1 Claim, No Drawings

PROCESS OF POLYMERIZING DIALLYLDIALKYL AMMONIUM COMPOUNDS WITH AZO CATALYST

DESCRIPTION

1. Technical Field of the Invention

The present invention relates to a process of polymerizing diallyldialkyl ammonium compounds in which the polymerization is carried out in an aqueous medium containing an inorganic salt and a free radical initiator that does not react with the inorganic salt to form a chain terminating agent.

BACKGROUND OF THE INVENTION

Polymers of diallyldialkyl ammonium compounds have a wide variety of uses. The cationic polymers, for example, can be used as flocculants in water and sewage treatment systems, etc. It has been shown that the higher the molecular weight of the resulting cationic polymer, the more effective the polymer is as a flocculating agent.

Methods for polymerizing diallyldialkyl ammonium compounds are well known in the prior art. See, e.g., U.S. Pat. Nos. 2,926,161; 2,982,749; 3,288,770; 3,461,163 and 4,092,467. Typically, polymerization is effected in an aqueous reaction medium containing a free radical initiator.

Fluoride salts have been reported to accelerate the rate of polymerization and to increase the molecular weight of the formed polymers. Halide salts other than fluoride (e.g., NaCl) did not accelerate polymerization. U.S. Pat. No. 4,742,134.

Where NaCl was formed as a by-product of diallyldialkyl ammonium compound preparation, that salt was reported not to interfere with the polymerization. U.S. Pat. No. 4,151,202.

Those prior studies on the effects of salts on diallyldialkyl ammonium compound polymerization were performed using diallyldimethyl ammonium chloride as the monomer and ammonium persulfate as the free radical initiator. It is well known that persulfate can react with (oxidize) the chloride ion of diallyldimethyl ammonium chloride or NaCl to produce a chlorine radical that serves to terminate polymerization and decrease the molecular weight of the formed polymer. Jaegar et al., *J. Macromol. Sci-Chem.*, A21(5):593 (1984).

It is also known that azo initiators such as 2,2'-azobis(2-amidinopropane) dihydrochloride (V-50) can be used in the polymerization of diallyldialkyl ammonium compounds. By way of example, Japanese Patent No. 56-18611 teaches a method of producing a diallyldimethyl ammonium chloride polymer using water soluble azo-based initiators at temperatures below 55° C. The effects of salts on that polymerization method were not reported.

Azo initiators are further reported to increase the molecular weight of formed polymers where the rate of polymerization is low. The effects of salts on that method were not reported. Jaeger et al., *J. Macromol. Sci.-Chem.*, A21(5):593 (1984).

East German Pat. No. 141, 029 [Chem. Abs., 94, 1222734c (1981) discloses polymerizing diallyldialkyl ammonium compounds in the presence of persulfate initiators and chloride salts but does not disclose that the presence of those ions enhances the rate of polymerization relative to termination or increases the molecular weight of the formed polymer. Because of the oxidation of chloride by persulfate and the chain terminating effects of formed chlorine radicals, this method is not likely to have the effect of increasing the molecular weight of the formed polymer.

BRIEF SUMMARY OF THE INVENTION

The present invention relates to a process of polymerizing a diallyldialkyl ammonium compound comprising the sequential steps of:

a) providing a water soluble free radical initiator;

b) forming a polymerization mixture by admixing in an aqueous medium (i) from about 1 percent by weight to about 30 percent by weight of an inorganic salt; (ii) from about 25 percent by weight to about 70 percent by weight of a diallyldialkyl ammonium compound, with the proviso that neither the inorganic salt nor a counterion of the diallyldialkyl ammonium compound react with the water soluble free radical initiator to form a chain transfer or chain terminating agent; and (iii) where the water soluble free radical initiator is other than an azo compound, an effective amount of a chelating agent;

c) purging the polymerization mixture with an inert gas;

d) heating the polymerization mixture with agitation to a temperature of from about 20° C. to about 90° C.;

e) slowly feeding to the polymerization mixture from about 0.2 percent by weight to about 5.0 percent by weight of the water soluble free radical initiator, the percent by weight relative to the concentration of the diallyldialkyl ammonium compound; and f) maintaining the temperature of the polymerization mixture at from about 20° C. to about 90° C. for a time period sufficient to polymerize the diallyldialkyl ammonium compound and form a polymer.

In a preferred embodiment, the diallyldialkyl ammonium compound is diallyldimethyl ammonium chloride, the inorganic salt is NaCl, the water soluble free radical initiator is 2,2'-azobis(2-amidinopropane) dihydrochloride, and the chelating agent is ethylenediamine tetraacetic acid.

DETAILED DESCRIPTION OF THE INVENTION

The present invention relates to a process for polymerizing diallyldialkyl ammonium compounds whereby the rate of polymerization is accelerated and the molecular weight of the resulting polymer is increased.

In accordance with that process, polymerization is carried out in an aqueous solution containing an inorganic salt and a water soluble free radical initiator that does not react with the inorganic salt or a counterion of the diallyldialkyl ammonium compound to form a chain transfer or chain terminating agent. The inorganic salt accelerates polymer propagation rates relative to chain termination rates, thus producing higher molecular weight polymers.

The inorganic salt can be supplied in any form that does not adversely affect the progress of the polymerization reaction and is at least partially soluble in the aqueous reaction medium. Exemplary inorganic salts include alkali metal, quaternary ammonium and certain alkaline earth metal salts. The salt anion can be a sulfate, a phosphate or a halide such as chloride, fluoride or bromide.

Where the water soluble free radical initiator is an azo compound, any of the inorganic salts can be used.

Inorganic salts having a halide anion are preferred. Exemplary inorganic salts having a halide anion are sodium, potassium, lithium, cesium and ammonium halides; tetramethylammonium and rimethylammonium halides; beryllium halides and the like. Where the diallyldialkyl ammonium compound is diallyldimethyl ammonium chloride (DADMAC) and the water soluble free radical initiator is an azo compound, sodium chloride (NaCl) is a preferred inorganic salt.

Certain anions of inorganic salts cannot be oxidized by any of the initiators used in the polymerization process of the present invention and, thus, can be used with any initiator. Exemplary of those non-oxidizable anions are sulfates, fluorides and phosphates.

The polymerization medium preferably contains from about 1 percent by weight to about 30 percent by weight, preferably from about 2 percent by weight to about 20 percent by weight, of the inorganic salt.

Water soluble free radical initiators that can be used in processes for polymerizing diallyldialkyl ammonium compounds are well known in the art. The only limitation is that the water soluble free radical initiator not react with (e.g. oxidize) the inorganic salt or a counterion of the diallyldialkyl ammonium compound to form chain transfer or chain terminating agents that lower the molecular weight of the polymer.

Because azo compound initiators are not strong oxidants, such azo compounds are preferred water soluble free radical initiators for use in the polymerization process of the present invention. Such initiators can be used with any of the inorganic salts disclosed herein. Exemplary azo compound initiators include azo compounds such as 2,2'-azobis(isobutyronitrile), 2-(carbamoylazo)isobutyronitrile, azo-bisisobutyramidine dihydrochloride (or as the free base), 2,2'-azobis'(N, N'-dimethyleneisobutyramidine) dihydrochloride (or as the free base), 4,4'-azo-bis(4-cyanopentanoic acid), 2,2'-azobis(2-amidinopropane) dihydrochloride (V-50) and the like. 2,2'-Azobis(2-amidinopropane) dihydrochloride (V-50) is preferred.

Alternatively, a water soluble free radical initiator other than an azo compound can be used in the polymerization process of the present invention with the proviso that such an initiator not react with (e.g. oxidize) the particular inorganic salt or counterion of the particular diallyldialkyl ammonium compound used in the polymerization process.

By way of example, peroxydisulfate initiators can be used where the anion of the inorganic salt or the counterion of the diallyldialkyl ammonium compound is a non-oxidizable anion such as a sulfate or a phosphate. Further, an organic peroxide that can generate free radicals such as alkyl peroxides, peroxyesters, diacylperoxides, and hydroperoxides can also be used.

The amount of the water soluble free radical initiators used in the polymerization process of the present invention is dependent upon the amount of the diallyldialkyl ammonium compound. The water soluble free radical initiator is present at a concentration of from about 0.2 to about 5.0 percent by weight of the diallyldialkyl ammonium compound.

The water soluble free radical initiator is slowly fed (added) to a polymerization mixture containing an inorganic salt, a diallyldialkyl ammonium compound and, if necessary, a chelating agent after that mixture is heated to the desired temperature.

In a preferred embodiment, the water soluble free radical initiator is added in two separate steps. In accordance with that embodiment, from about 30 percent to about 75 percent of the total amount of initiator is slowly added to a polymerization mixture which is heated to from about 20° C. to about 90° C. until polymerization is from about 50 percent to about 95 percent and, preferably from about 80 percent to about 90 percent complete. The remaining amount of the water soluble free radical initiator is then added to the polymerization mixture and the mixture heated to from about 20° C. to about 90° C. for a period of time sufficient to complete the polymerization.

Although the invention is applicable to the polymerization of any diallyldialkyl ammonium compound, it is particularly applicable for the polymerization of diallyldialkyl halides and, preferably diallyldialkyl ammonium chlorides. In a preferred embodiment, the diallyldialkyl ammonium compound is diallyldimethyl ammonium chloride (DADMAC).

The polymerization medium preferably contains from about 10 percent by weight to about 70 percent by weight, preferably from about 20 percent by weight to about 60 percent by weight, of the monomer.

Preferably the polymerization process is carried out in the absence of oxygen. Oxygen can be removed from the polymerization mixture by purging the latter with an inert gas such as nitrogen or argon. The polymerization process can then be conducted under a blanket of the inert gas.

Preferably, the temperature of the reaction is maintained at between about 20° C. and about 90° C., most preferably between about 30° C. and about 70° C. The reaction (polymerization) mixture is preferably an aqueous medium to ensure maximum solubility of the reactants.

Where the water soluble free radical initiator is not an azo compound, the aqueous medium contains an effective amount of a metal ion chelating agent. An effective amount of a chelating agent is that amount needed to chelate oxidizable metal ions such as iron, copper, cobalt or zinc that may be present in the polymerization mixture.

Means for determining the effective amount of a chelating agent are well known and readily apparent to a skilled artisan. Preferably, polymerization according to the process of the present invention is carried out in a polymerization mixture containing from about 0.005 percent by weight to about 0.05 percent by weight of a chelating agent.

Chelating agents suitable for use in polymerizing diallyldialkyl ammonium compounds are well known to those of skill in the art. A preferred chelating agent is ethylenediamine tetraacetic acid (EDTA) tetra sodium salt. A chelating agent is not needed where the water soluble free radical initiator is an azo compound.

In one embodiment, a process of polymerizing a diallyldialkyl ammonium compound comprises the sequential steps of:

a) providing a water soluble free radical initiator;

b) forming a polymerization mixture by admixing in an aqueous medium (i) from about 1 percent by weight to about 30 percent by weight of an inorganic salt; (ii) from about 25 percent by weight to about 70 percent by weight of a diallyldialkyl ammonium compound, with the proviso that neither the inorganic salt nor a counterion of the diallyldialkyl ammonium compound react with the water soluble free radical initiator to form a chain transfer or chain terminating agent; and (iii) where the water soluble free radical initiator is other than an azo compound, an effective amount of a chelating agent;

c) purging the polymerization mixture with an inert gas;

d) heating the polymerization mixture with agitation to a temperature of from about 20° C. to about 90° C.;

e) slowly feeding to the polymerization mixture from about 0.2 percent by weight to about 5.0 percent by weight of the water soluble free radical initiator, the percent by weight relative to the concentration of the diallyldialkyl ammonium compound; and f) maintaining the temperature of the polymerization mixture at from about 20° C. to about 90° C. for a time period sufficient to polymerize the diallyldialkyl ammonium compound and form a polymer.

Those skilled in the art, being aware of the principles of the present invention as disclosed herein, will be capable of selecting particular values of the various parameters (e.g. inorganic salt concentration, free radical initiator concentration and temperature) to achieve particular desired results without undue experimentation.

After polymerization, the polymer may be recovered, i.e., removed from the reactor and handled as necessary. It may be diluted with water and used as such, or the polymer can be isolated by the usual procedures of isolating polymers. The polymer can be converted to a desired salt form by either ion exchange (U.S. Pat. No. 3,288,770), dialysis, or ultrafiltration.

The following example illustrates a particular embodiment of the present invention and is not limiting of the specification and claims in any way.

EXAMPLE 1

Effects of NaCl on DADMAC Polymerization

A polymerization mixture was formed by admixing in an aqueous medium (i) various concentrations of diallyldimethyl ammonium chloride (DADMAC), (ii) various concentrations of NaCl and (iii) 0.010 percent by weight EDTA tetra sodium salt. The polymerization mixture was purged with nitrogen gas and heated with agitation to a temperature of from 52° C. to 62° C. A solution containing the desired amount of 2,2'-azobis (2-amidinopropane) dihydrochloride (V-50) (from 0.50 to about 1.50 percent by weight relative to the diallydimethyl ammonium chloride concentration) was slowly fed to the polymerization mixture and the temperature was maintained at 52° C. to 62° C. until polymerization was 80–90 percent complete (4–12 hours). Water was added as necessary to control bulk viscosity and maintain mixing. The mixture was heated to 82 ° C. and an additional amount of 2,2'-azobis(2-amidinoproprane) dihydrochloride (V-50) (from about 0.50 to about 1.50 percent by weight relative to the diallydimethyl ammonium chloride concentration) was added. The temperature was maintained at about 82° C. for 1 hour to complete the polymerization.

The polymer was recovered and the percent conversion and intrinsic viscosity determined using standard procedures well known to one of ordinary skill in the art. The results of these studies are summarized in Table 1, below.

TABLE 1

| | | DADMAC Polymerization | | | |
|---|---|---|---|---|---|
| Initial DADMAC Conc (wt %) | Initial NaCl Conc (wt %) | V-50 Level as % of monomer | Polymerization Temp (deg. C.) | Percent Conversion | Intrinsic Viscosity* |
| 47 | 2 | 0.99 | 52 | 86 | 0.98 |
| 47 | 20 | 0.99 | 52 | 91 | 1.45 |
| 47 | 2 | 0.99 | 62 | 89 | 0.94 |
| 47 | 20 | 0.99 | 62 | 91 | 1.64 |
| 47 | 2 | 2.97 | 52 | 95 | 0.96 |
| 47 | 20 | 2.97 | 52 | 97 | 1.46 |
| 47 | 2 | 2.97 | 62 | 96 | 0.87 |
| 47 | 20 | 2.97 | 62 | 98 | 1.17 |
| 67 | 2 | 0.99 | 52 | 86 | 1.31 |
| 67 | 20 | 0.99 | 52 | 86 | 2.07 |
| 67 | 2 | 0.99 | 62 | 91 | 1.34 |
| 67 | 20 | 0.99 | 62 | 92 | 1.80 |
| 67 | 2 | 2.97 | 52 | 93 | 1.49 |
| 67 | 20 | 2.97 | 52 | 94 | 1.84 |
| 67 | 2 | 2.97 | 62 | 94 | 1.07 |
| 67 | 20 | 2.97 | 62 | runaway reaction | |
| 57 | 11 | 1.98 | 57 | 95 | 1.47 |
| 57 | 11 | 1.98 | 57 | 96 | 1.29 |
| 57 | 11 | 1.98 | 57 | 95 | 1.42 |

*dL/g, measrued in 1.0 M sodium nitrate

The results clearly show that polymer molecular weights are increased by the presence of the inorganic salt, NaCl, in the polymerization mixture.

Although the present invention has now been described in terms of certain preferred embodiments, and exemplified with respect thereto, one skilled in the art will readily appreciate that various modifications, changes, omissions and substitutions can be made without departing from the spirit thereof.

We claim:

1. A process of polymerizing diallyldiemethyl ammonium chloride comprising the sequential steps of
   a) forming a polymerization mixture by admixing in an aqueous medium (1) from about 2 percent by weight to about 20 percent by weight of sodium chloride; (ii) from about 40 percent by weight to about 70 percent by weight of said diallyldimethyl ammonium chloride; and (iii) 0.01 percent by weight of ethylenediamine tetraacetic acid tetra sodium salt;
   b) purging said polymerization mixture with nitrogen gas;
   c) heating said polymerization mixture with agitation to a temperature of from about 50° C. to about 65° C.;
   d) slowly feeding to said polymerization mixture from about 0.5 percent by weight to about 1.5 percent by weight of 2,2'-azobis (2-amidinopropane) dihydrochloride, the percent by weight being relative to the concentration of said diallyldimethyl ammonium chloride;

e) heating said polymerization mixture to a temperature of from about 50° C. to about 65° C. for from about 4 hours to about 12 hours;

f) slowing feeding to said polymerization mixture from about 0.5 percent by weight to about 1.5 percent by weight of 2,2'-azobis (2-amidinopropane) dihydrochloride, the percent by weight being relative to the concentration of said diallyldimethyl ammonium chloride; and g) maintaining the temperature of said polymerization mixture at from about 50° C. to about 85° C. for a time period sufficient for said diallyldimethyl ammonium chloride to polymerize and form a polymer.

* * * * *